United States Patent
Low et al.

(10) Patent No.: US 12,483,640 B2
(45) Date of Patent: Nov. 25, 2025

(54) MODULAR 5G UE LAYER-2 DATA STACK SOLUTIONS FOR HIGH THROUGHPUT AND LOW LATENCY DATA TRANSFER

(71) Applicant: GREATER SHINE LIMITED, New Taipei (TW)

(72) Inventors: Su-Lin Low, San Diego, CA (US); Tianan Tim Ma, San Diego, CA (US); Hong Kui Yang, San Diego, CA (US); Hausting Hong, San Diego, CA (US); Chun-I Lee, San Diego, CA (US); Jianzhou Li, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 337 days.

(21) Appl. No.: 18/063,670

(22) Filed: Dec. 8, 2022

(65) Prior Publication Data
US 2023/0105582 A1    Apr. 6, 2023

Related U.S. Application Data

(63) Continuation of application No. PCT/US2021/014934, filed on Jan. 25, 2021.

(60) Provisional application No. 63/036,736, filed on Jun. 9, 2020.

(51) Int. Cl.
*H04L 69/324* (2022.01)
*H04L 69/18* (2022.01)
*H04W 80/02* (2009.01)

(52) U.S. Cl.
CPC ............ *H04L 69/324* (2013.01); *H04L 69/18* (2013.01); *H04W 80/02* (2013.01)

(58) Field of Classification Search
CPC ....... H04L 69/324; H04L 69/18; H04W 80/02
See application file for complete search history.

(56) References Cited

U.S. PATENT DOCUMENTS

| 10,257,329 | B2 | 4/2019 | Aziz |
| 2005/0120122 | A1 | 6/2005 | Farnham |
| 2008/0279129 | A1 | 11/2008 | Zhodzishsky |
| 2018/0083688 | A1 | 3/2018 | Agiwal et al. |

(Continued)

OTHER PUBLICATIONS

Extended European Search Report No. 21722356.9, issued on Jul. 21, 2023, 9 pages.

(Continued)

*Primary Examiner* — Shawn D Miller
(74) *Attorney, Agent, or Firm* — PERKINS COIE LLP

(57) ABSTRACT

Methods for providing a layer-2 data stack solution in a data plane and associated devices are provided. In some embodiments, the method includes (i) determining, among a plurality of data stack solutions that are selectable, which layer-2 data stack solution is selected and (ii) causing, according to the selected layer-2 data stack solution, the layer-2 micro controller to intervene with a data plane hardware module that is configured to implement a specific layer-2 data stack function. Each of the plurality of data stack solutions represents a distinctive intervening configuration of a layer-2 micro controller. The layer-2 micro controller is coupled to a number of data plane hardware modules that are configured to implement different layer-2 data stack functions. The intervening configuration of the layer-2 micro controller is indicative of a level of control of the layer-2 micro controller over the data plane hardware modules.

19 Claims, 7 Drawing Sheets

(56) References Cited

U.S. PATENT DOCUMENTS

2018/0343600 A1    11/2018  Ma et al.
2018/0368192 A1    12/2018  Arditti Ilitzky et al.
2019/0045421 A1     2/2019  Shah et al.

OTHER PUBLICATIONS

International Search Report and Written mailed Apr. 6, 2021 of PCT/US2021/014934 (14 pages).
First Office Action issued to Chinese Application No. 202180035806.2 dated Mar. 28, 2025 with English translation (15p).
Second Office Action issued to Chinese Application No. 202180035806.2 dated Aug. 19, 2025 with English translation, 10 pages.

MODULAR 5G UE LAYER-2 DATA STACK SOLUTIONS FOR HIGH THROUGHPUT AND LOW LATENCY DATA TRANSFER

CROSS-REFERENCE TO RELATED APPLICATION(S)

This application is a continuation of PCT Application No. PCT/US2021/014934, filed Jan. 25, 2021, which claims the benefit of U.S. Provisional Patent Application Ser. No. 63/036,736, filed Jun. 9, 2020, which is incorporated by reference herein in its entirety.

TECHNICAL FIELD

This application relates to the communications field, and more specifically, to a wireless communications system, method, and device.

BACKGROUND

Rapid growth in computing technology is creating a greater demand for data communication. The increasing demand in turn drives further growth in communication technology, which often requires additional features, increased processing capacities, and/or increased resources within a given space. Such growth often introduces new challenges. Traditional 3rd Generation Partnership Project (3GPP) Layer-2 data stacks are tightly coupled with protocol stacks of a physical layer, Layer-3/Layer-4, and a control plane. No clear distinction is made between the functional partition of packet operation according to its layers or processing requirements. The challenges in a 5G (the fifth generation technology standard for broadband cellular networks) modem is to be able to design a data path architecture that can support high throughput and extreme low latency data packet applications. Traditional software packet data processing solutions are not able to fulfil 5G packet data requirements, and these traditional solutions require high cost processors with complex software designs. Therefore, it is advantageous to have an improved method to address this need.

SUMMARY

The present disclosure provides an adaptable and programmable 5G user equipment (UE) layer-2 data stack solution. The layer-2 data stack solution is customizable and can be implemented by a data plane hardware (DPHW, which includes multiple hardware modules), a data plane micro controller (μC), a control-plane processor, or a combination thereof. The present layer-2 data stack solution can be used in 4G (the fourth generation technology standard for broadband cellular networks), 5G and/or future communications systems and provides high throughput, low latency, and seamless Quality of service (QoS) data packet operations. For example, the present disclosure enables UE manufacturers/vendors to customize and integrate their 4G/5G Layer-2 data stack products so as to fit customers' needs.

A telecommunications architecture often includes three basic components, a data plane (DP), a control plane (CP), and a management plane (MP). The control plane and the management plane serve the data plane. The data plane carries user traffic and can be named as a user plane, forwarding plane, carrier plane or bearer plane. The management plane of a networking system configures, monitors, and provides management, monitoring and configuration services to, all layers of the network stack and other parts of the system. The control plane controls routing tasks, which determine which path to use to send packets or frames. For example, the control plane populates routing tables, network topology, and forwarding tables so as to enable data plane functions. An example of the telecommunications architecture is discussed in detail with reference to FIG. 1.

The present layer-2 data stack solution is implemented in a data plane of a network. More particularly, the present layer-2 data stack solution provides a micro controller and data plane hardware configured to implement layer-2 data stack functions. The data plane hardware can include multiple hardware components to implement different layer-2 data stack functions. The micro controller is configurable to manage and control the multiple hardware components of the data plane hardware. Accordingly, the micro controller can verify, monitor, or "intervene" the implementation of the layer-2 data stack functions by the data plane hardware. By this arrangement, the present disclosure provides a flexible layer-2 data stack design for various types of user equipment. Embodiments of the present layer-2 data stack solutions are discussed in detail with reference to FIGS. 3, 4, and 5.

The present disclosure provides various application programming interfaces (APIs) for communicating with the control plane or other communication layers. For example, the present layer-2 data stack solution includes (i) a datapath-control (DPC) API configured to communicate or interface with a DPC layer of a control plane; (ii) a layer-3/layer-4 API configured to communicate or interface with a layer-3/layer-4 data stack in the data plane; and/or (iii) a physical layer (PHY) API configured to communicate or interface with a PHY subsystem. Embodiments of the present layer-2 data stack solution are discussed in detail with reference to FIG. 2.

One aspect of the present disclosure is that it enables UE vendors/manufacturers to customize performance and control of downlink (DL) and uplink (UL) communications, which enhances flexibility and system efficiency. Embodiments of DL communications of the present layer-2 data stack solution are discussed in detail with reference to FIG. 3. Embodiments of UL communications of the present layer-2 data stack solution are discussed in detail with reference to FIG. 4.

Another aspect of the present disclosure is to provide a method for implementing a layer-2 data stack solution. The method includes, for example, (i) communicating with a DPC layer of a control plane via a DPC API of the layer-2 data stack solution; (ii) communicating with a layer-3/layer-4 data stack via a layer-3/layer-4 API of the layer-2 data stack solution; and (iii) communicating with a PHY subsystem via a PHY API of the layer-2 data stack solution. The method may include storing information associated with the layer-2 data stack solution in a layer-3 external memory or a L2 local memory. The stored information can be accessed via the APIs.

In some embodiment, the present method can be implemented by a tangible, non-transitory, computer-readable medium having processor instructions stored thereon that, when executed by one or more processors, cause the one or more processors to perform one or more aspects/features of the method described herein.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

DETAILED DESCRIPTION

The following describes the technical solutions in the one or more implementations of the present disclosure. The present disclosure provides a layer-2 data stack solution for a terminal device. The present layer-2 data stack solution is implemented in a data plane of a network. The present layer-2 data stack solution provides a data-path-control (DPC) API configured to communicate or interface with a DPC layer of a control plane, a layer-3/layer-4 API configured to communicate or interface with a layer-3/layer-4 data stack in the data plane, and/or a physical layer (PHY) API configured to communicate or interface with a PHY subsystem. The layer-2 data stack solution is customizable and can be implemented by a data plane hardware (DPHW), a data plane micro controller (μC), a control-plane processor, or a combination thereof.

Communications Environment

Figure 1:
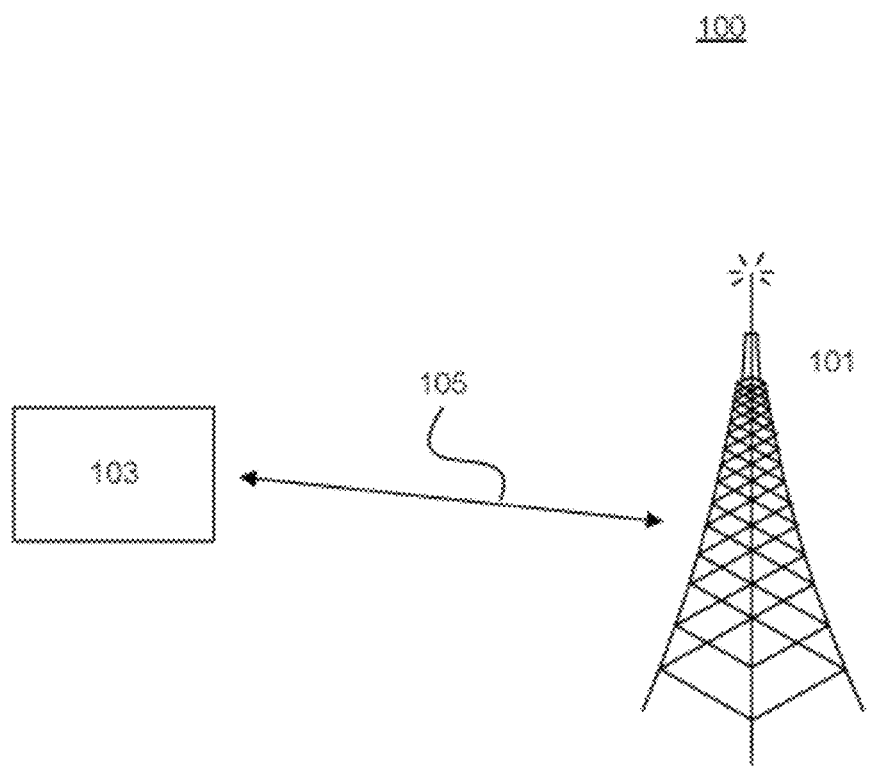
FIG. 1 is a schematic diagram of a wireless communication system in accordance with one or more implementations of the present disclosure.

FIG. 1 illustrates a wireless communications system 100 for implementing the present layer-2 data stack solution. As shown in FIG. 1, the wireless communications system 100 can include a network device 101. Examples of the network device 110 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device 110 can include a relay station, an access point, an in-vehicle device, a wearable device, and the like. The network device 110 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network may be referred to as a new radio (New Radio, NR) system or network.

As shown in FIG. 1, the wireless communications system 100 also includes a terminal device 103. The terminal device 103 can be an end-user device configured to facilitate wireless communication. The terminal device 103 can be configured to wirelessly connect to the network device 101 (via, e.g., a wireless channel 105) according to one or more corresponding communication protocols/standards. The terminal device 103 may be mobile or fixed. The terminal device 103 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 103 include a modem, a cellular phone, a smart phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an IoT device, a terminal device in a future 5G network, a terminal device in a future evolved PLMN, or the like.

For illustrative purposes, FIG. 1 illustrates only one network device 101 and one terminal device 103 in the wireless communications system 100. However, it is understood that, in some instances, the wireless communications system 100 can include additional/other devices, such as additional instances of the network device 101 and/or the terminal device 103, a network controller, a mobility management entity/devices, etc.

Wireless Communication Architecture

Figure 2A:
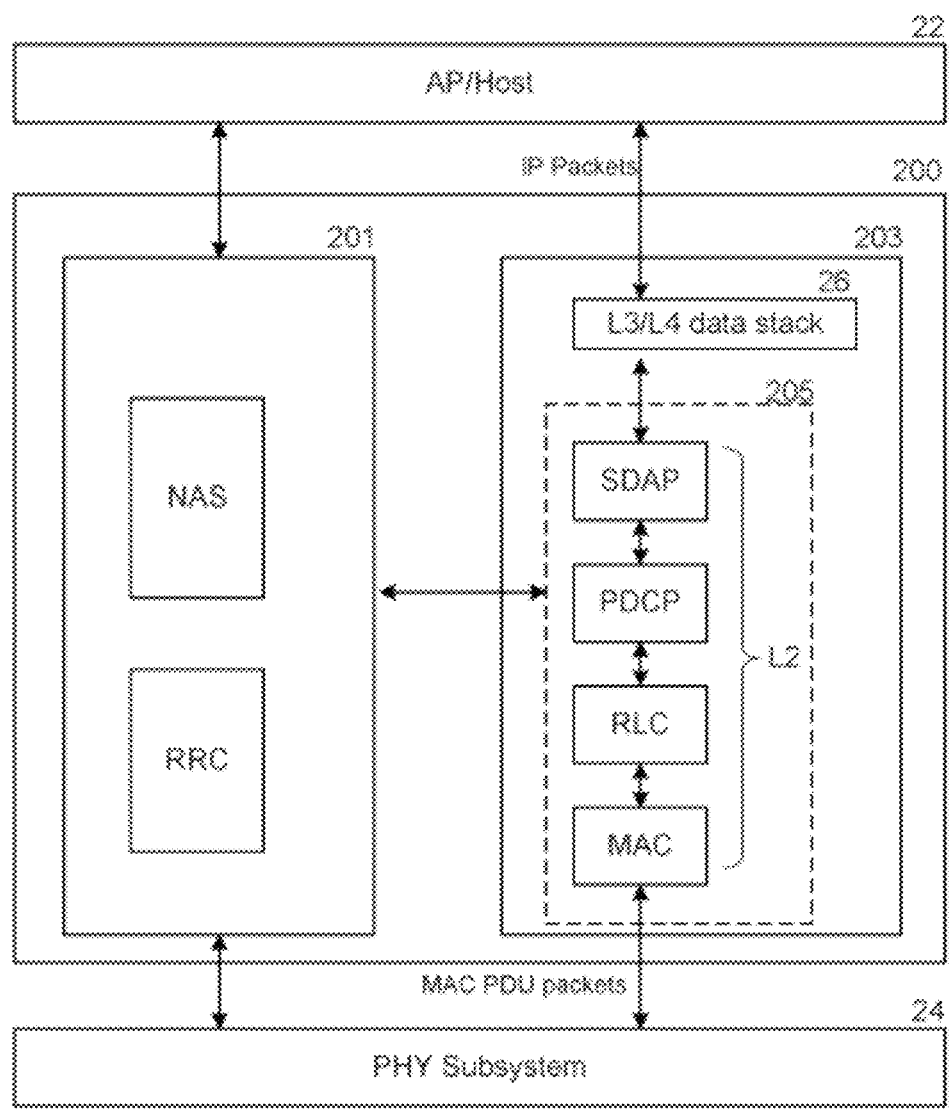
FIG. 2A is a schematic diagram illustrating elements of a network architecture in accordance with one or more implementations of the present disclosure.

FIG. 2A is a schematic diagram illustrating elements of a network architecture 20A for a UE protocol stack 200 in accordance with one or more implementations of the present disclosure. The UE protocol stack 200 is configured to communicate with an application or host layer 22, as well as a physical layer (PHY) subsystem 24. For example, the UE protocol stack 200 can communicate with the application layer 22 via Internet Protocol (IP) packets. As another example, the UE protocol stack 200 communicates with the PHY subsystem 24 via Media Access Control (MAC) Protocol Data Unit (PDU) packets.

As shown, the UE protocol stack 200 includes a control plane 201 and a data plane 203. The control plane 201 handles functions such as a Non Access Stratum (NAS) function and a Radio Resource Control (RRC) function. The NAS function handles network layer control such as mobility management, session management, security management, and system selection. The RRC function handles radio resources allocation and configuration, radio channel control of radio bearers (and logical channels), and security (such as ciphering, integrity configurations, etc.).

The data plane 203 is configured to handle layer-2 (L2), and layer-3/layer-4 (L3/L4) functions (indicted as L3/L4 data stack 26 in FIG. 2A). Layer-2 functions relate to the 3GPP protocols for packet data processing. In the illustrated embodiments, the layer-2 functions are implemented by a layer-2 data stack solution 205.

As shown in FIG. 2A, the layer-2 data stack solution 205 can handle functions for a MAC layer, a Radio Link Control (RLC) layer, a Packet Data Convergence Protocol (PDCP) layer, and a Service Data Adaptation Protocol (SDAP) layer. The MAC Layer relates to network multiplexing and demultiplexing, as well as mapping of logical channels to transport channels. The RLC Layer relates to automatic repeat requests (ARQs) at radio link level, as well as error recovery of each logical channel. The PDCP Layer relates to packet level processing for data ciphering, integrity, and compression. The SDAP Layer relates to quality of service (QoS) classifications (e.g., mapping QoS flows to corresponding Data Radio Bearers). In the data plane 203, layer 3 and layer 4 relate to IP related functions, such as IP Header Extraction, IP Checksum, IP Tracing, IP Routing and Classification, etc.

In the illustrated embodiments, the layer-2 data stack solution 205 can be implemented by a main processor of a UE (e.g., a modem), a data plane hardware (DPHW), a data plane micro controller (µC), a control-plane processor, or a combination thereof. Details of the layer-2 data stack solution 205 are discussed with reference to FIG. 2B.

Figure 2B:
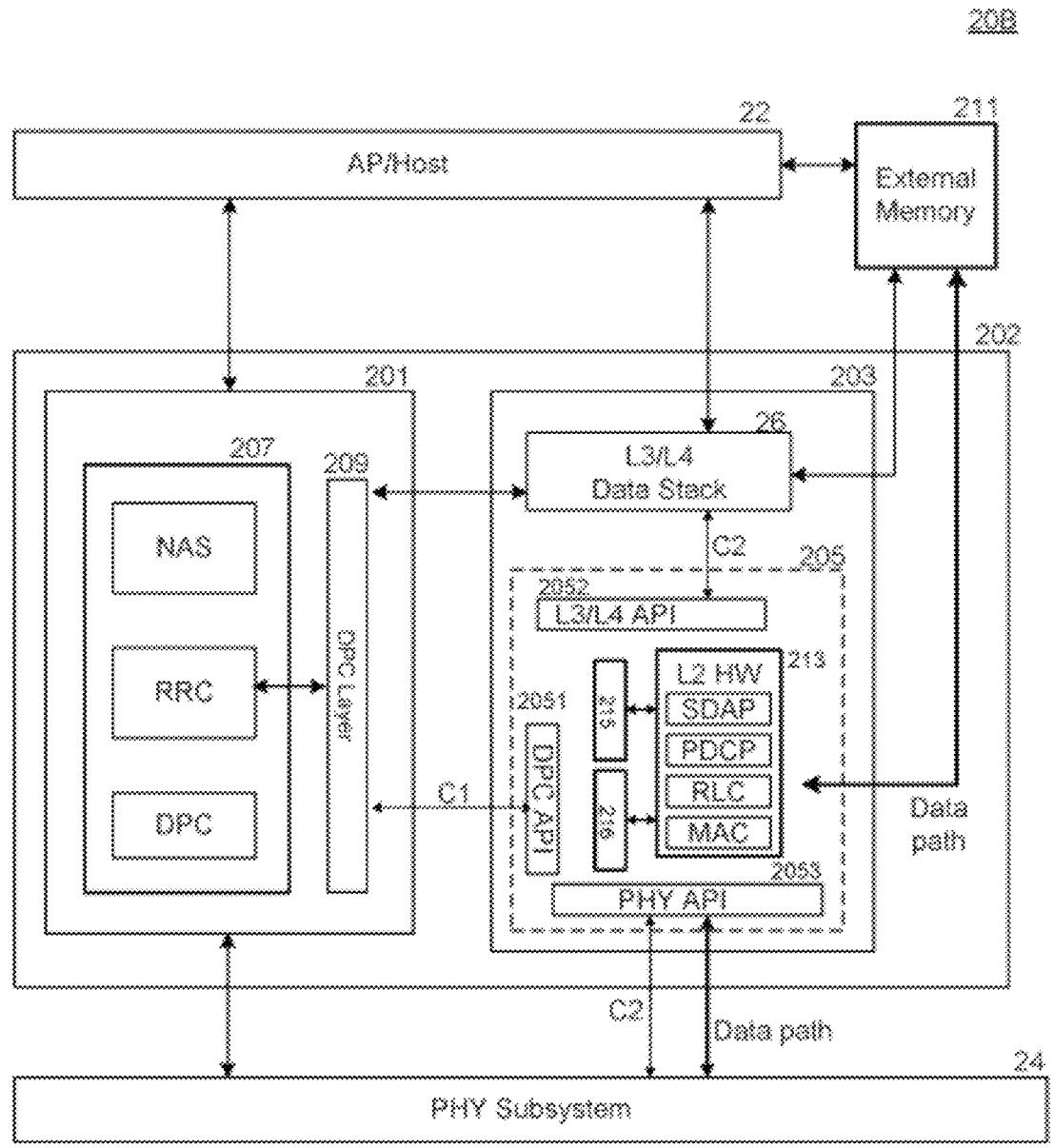
FIG. 2B is a schematic diagram of a network architecture in accordance with one or more implementations of the present disclosure.

FIG. 2B is a schematic diagram of a network architecture 20B for a UE protocol stack 200 in accordance with one or more implementations of the present disclosure. The UE protocol stack 202 is configured to communicate with an application or host layer 22, as well as a physical layer (PHY) 24. As shown, the UE protocol stack 202 includes a control plane 201 and a data plane 203. In some embodiments, the UE protocol stack 200 can be used for an UE such as a modem.

The control plane 201 be controlled by a main processor 207 of the UE. The main processor 207 is configured to handle NAS and RRC functions. The main processor 207 is also configured to handle data path control (DPC) via a DPC layer 209. Via the DPC layer 209, the control plane 201 can control and communicate with the data plane 203. The UE can include an external memory 211 configured to store information associated with the data plane 203. The stored information in the external memory 211 can be accessed by the application layer 22 and the data plane 203.

The data plane 203 is configured to handle layer-2 (L2) and layer-3/layer-4 (L3/L4) functions (indicted as L3/L4 data stack 26 in FIG. 2B). Layer-2 functions relate to the 3GPP protocols for packet data processing. In the illustrated embodiments, a layer-2 data stack solution 205 handles the layer-2 functions.

As shown in FIG. 2B, the layer-2 data stack solution 205 includes a data-path-control (DPC) API 2051 for communicating with the DPC layer 209 of the control plane 201 (indicated as "C1" in FIG. 2B). The layer-2 data stack solution 205 also includes an L3/L4 API 2052 for communicating with the L3/L4 data stack 26 (indicated as "C2" in FIG. 2B). The layer-2 data stack solution 205 further includes a PHY API 2053 for communicating with the PHY subsystem 24 (indicated as "C3" in FIG. 2B). With these APIs 2051, 2052, and 2053, the layer-2 data stack solution 205 enables a vendor or manufacturer of the UE to customize the functions of the layer 2 data stack.

For example, in some embodiments, the layer-2 data stack solution 205 can include a layer-2 hardware (L2 HW) 213 configured to handle layer-2 functions such as SDAP, PDCP, RLC, and MAC functions. In some embodiments, the layer-2 hardware 213 can be an automated hardware that can automatically execute the foregoing functions based on preset instructions. In some embodiments, the layer-2 data stack solution 205 can include a layer-2 micro controller 215, configured to implement at least a portion of the layer-2 functions. The layer-2 data stack solution 205 can also include a layer-2 local memory 216 to store information associated with the layer-2 data stack solution 205.

In some embodiments, at least a portion of the layer-2 functions can be implemented the main processor 207. Through the APIs 2051, 2052, and 2053, the layer-2 data stack solution 205 enables the layer 2 functions to be are implemented by the layer-2 hardware 213, the micro controller 215, the main processor 207, or a combination thereof. For example, by adjusting an amount of a local buffer storage of the main processors 207, the main processor 207 can partially implement the layer-2 functions.

Data-Path-Control (DPC) API

The data-path-control (DPC) API 2051 is configured to interface with the DPC layer 209 of the control plane 201, so as to configure RRC parameters in the L2 micro controller 215 or a layer-2(L2) local memory (not shown in FIG. 2). The DPC API 2051 is also configured to interface with the main processor 207 via the DPC layer 209. The DPC layer 209 can consolidate data plane related control parameters and route them to the L2 micro controller 215 or the L2 local memory in the data plane 203. For example, these control parameters can include, Signaling Radio Bearers queues and parameters, Data Radio Bearers queues and parameters, Logical Channels queues and parameters, Logical Channels queues and parameters, RLC parameters (e.g., window size, sequence number bit lengths, RLC modes (AM/UM/TM), etc.), MAC linkage control package (LCP) parameters (LCP bucket size, rates, maximum size, etc.), PDCP Security Key parameters (e.g., ciphering and integrity keys for RRC), PDCP Robust Header Compression (RoHC) and Uplink Data Compression (UDC) parameters (e.g., RoHC profiles and parameters), and/or other suitable configuration data.

L3/L4 Data Stack API

The L3/L4 API 2052 is configured to interface with the L3/L4 data stack 26. The L3/L4 API 2052 can include a downlink (DL) data path interworking API and an uplink (UL) data path interworking API. The L3/L4 API 2052 can further include DL packet descriptor information, which can be passed from the layer-2 data stack solution 205 to the L3/L4 data stack 26. The L3/L4 API 2052 can also include UL packet descriptor information, which can be passed from the L3/L4 data stack 26 to the layer-2 data stack solution 205.

In some embodiments, the DL/UL packet descriptor information can be stored in the L3 external memory 211, while corresponding layer-2 and/or layer 3 data queues are stored in the L2 micro controller 215 or the L2 local memory. By this arrangement, controller/memory storage space can be flexibly arranged so as to improve an overall efficiency.

In some embodiments, during UL/DL processes, the L3/L4 API 2052 can be used to pass logical channel packet descriptors. For example, in a DL process, the L3/L4 API 2052 can include a DL data path, L2 data packet descriptors, L2 Radio Bearer queues per component carrier (CC), etc. In an UL process, the L3/L4 API 2052 can include L3 data packet descriptors, L3 IP flow queues, L2 logical channel queues (e.g., RLC status, RLC retransmission queues, etc.), L2 MAC control element (CE) queues, etc.

PHY API

The PHY API 2053 is configured to interwork with the PHY layer 24 of the UE. The PHY API 2053 can include handshake signals to control the data bytes direct streaming between a local buffer or memory of the layer-2 data stack solution (e.g., handled by the micro controller). The PHY API 2053 include an UL PHY API and a DL PHY API. The DL PHY API includes a DL data path, indicating information such as PHY to MAC layer Code Block data bytes (e.g., after a successful PHY DL decoding from a DL hybrid automatic repeat request (HARQ)). The UL PHY API includes a UL data path, indicating information such as MAC to PHY layer Code Block data bytes (e.g., upon a PHY ready signal to pull data for transmission).

Based on the foregoing arrangement, the layer-2 data stack solution 205 can provide customizable data mode solutions for packet data transfer, for both DL and UL, with effective and desired performance and control. These customizable data mode solutions allows a vendor or manufacturer of a UE to determine the details regarding how to process the layer-2 functions by using various processors/controllers. For example, the layer-2 functions can be automatically performed by an automated data planer hardware (e.g., the layer-2 hardware 213) (Solution "A" discussed in FIGS. 3 and 4). In some cases, the implementation of the layer-2 functions can be controlled by a micro controller (e.g., L2 micro controller 215) (Solution "B" discussed in FIGS. 3 and 4). In some embodiments, the layer-2 functions can be implemented in a hybrid mode by using data-path-control (DPC) software as well as the APIs provided by the layer-2 data stack solution 205 (Solution "C" discussed in FIGS. 3 and 4).

Figure 3:
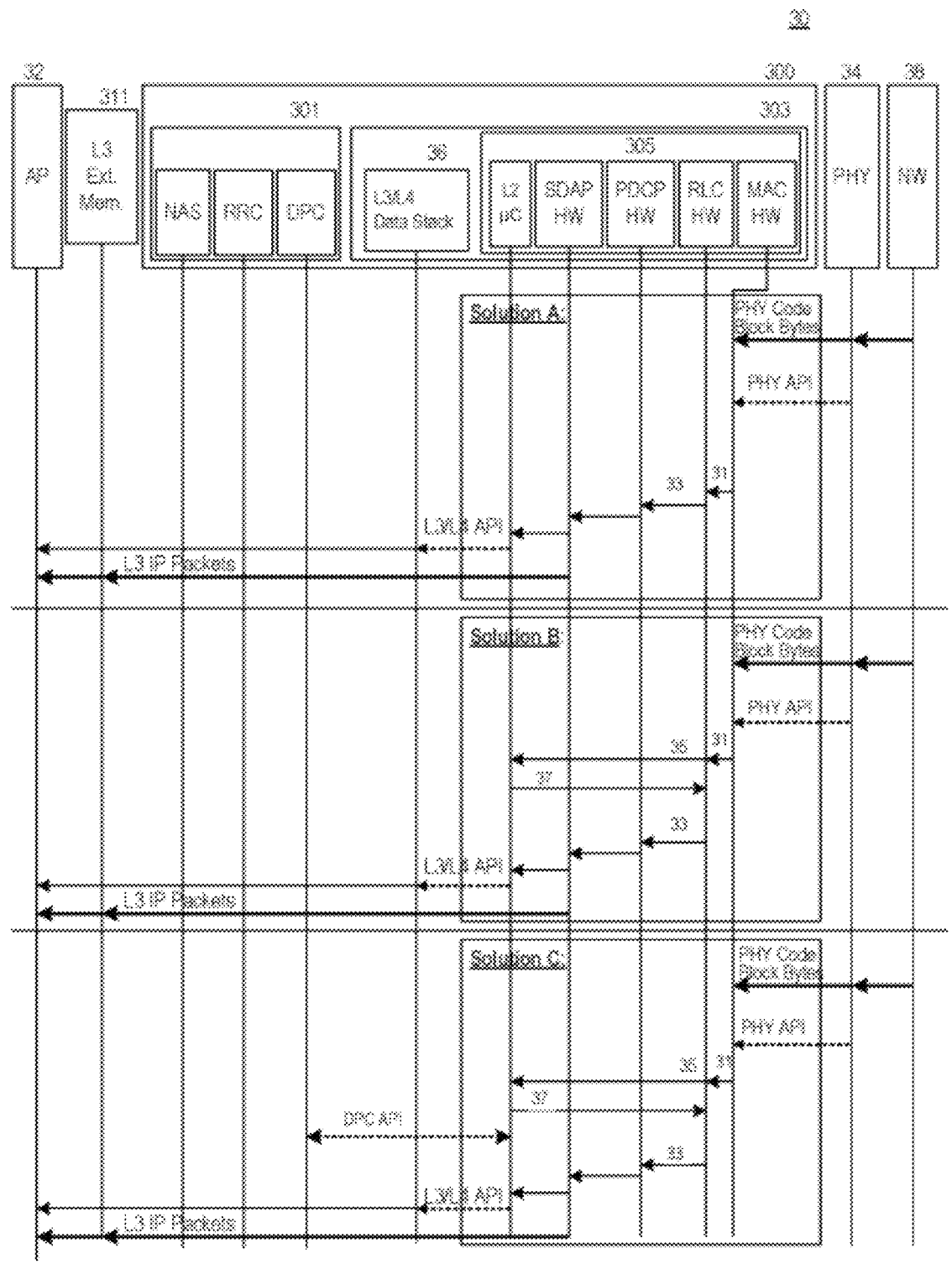
FIG. 3 is a schematic diagram illustrating a downlink (DL) data transfer process in accordance with implementations of the present disclosure.

FIG. 3 is a schematic diagram illustrating a downlink (DL) data transfer process 30 of a UE in accordance with one or more implementations of the present disclosure. In FIG. 3, data flow is indicated by bold arrows. Dashed arrows indicate processes involving an API, whereas solid arrows indicates data processing steps. As shown in FIG. 3, in the downlink (DL) data transfer process 30, data is transferred from a network (NW) 38 to an application (AP) 32, via a physical layer 34 and L2/L3/L4 layers of a UE protocol stack 300. The UE protocol stack 300 includes (1) a control plane 301 configured to control the data transfer and (2) a data plane 303 configured to transfer/process the data transfer.

The control plane 301 performs NAS, RRC, and DPC functions (as discussed above with reference to FIGS. 2A and 2B). The data plan 305 includes an L2 data plane solution 305 and an L3/L4 data stack 36. The L2 data plane solution 305 includes data plane hardware (DPHW) configured to perform SDAP, PDCP, RLC, and MAC layer functions (indicated as SDAP HW, PDCP HW, RLC HW, and MAC HW in FIG. 3).

The L2 data plane solution 305 includes a micro controller L2 µC configured to control the data plane hardware (DPHW) and perform functions involving APIs (e.g., L3/L4 API, PHY API, and DPC API, as discussed above in FIGS. 2A and 2B) of the L2 data plane solution 305. The UE can include a main processor (not shown in FIG. 3) and an L3 external memory 311. The L3 external memory 311 is configured to store information associated with the L2 data plane solution 305.

After RRC connection is setup (i.e., packet data transfer is enabled), the L2 data plane solution 305 starts receiving code block data bytes from the PHY layer 34. These data bytes can be streamed into a local L2 buffer in the L2 data plane solution 305. The L2 data plane solution 305 then processes these data bytes, performs MAC decoding and header extraction, and generates the packet descriptors for the rest of the L2 layers. The processed packets and their descriptors will be sent to the L3/L4 data stack 36 through the L3/L4 API. The final processed packets and their descriptors will be sent to the L3/L4 Data Stack through the L3/L4 API.

The L2 data plane solution 305 provides configurable and programmable DL mode settings, including various types of implementations. For the illustration purposes, three examples, Solutions A, B, and C, and the corresponding processes are discussed with reference to in FIG. 3.

Downlink Solution A: Automated Data Plane Hardware (DPHW)

In this solution, the L2 data plane solution 305 performs a fast processing by using fully automated DPHW layers. During a configuration setup, the L2 data plane solution 305 is programmed with semi-static parameters for radio bearers, logical channels, and MAC layers. Once PHY code block bytes are received, MAC layer hardware (MAC HW) decodes the byte stream to extract "MAC header" and "MAC SubPDUs (Sub Protocol Data Unit)," then forwards the packet to RLC layer hardware (RLC HW), which then extracts "RLC headers," indicated as Step 31 in FIG. 3. The RLC layer hardware (RLC HW) then performs RLC packet processing including De-Segmentation and Reassembly, De-Concatenation, Re-Ordering, and RLC ARQ for radio link recovery.

Once the RLC packet bytes are extracted, they are forwarded to PDCP layer hardware (PDCP HW), where PDCP packet processing is performed (e.g., de-ciphering, integrity check, RoHC Header de-compression, etc.), indicated as Step 33 in FIG. 3.

Once complete, the data bytes are transferred to the L3 external memory 311 (indicated by bold arrow). The SDAP layer hardware (SDAP HW) then takes over, performs QoS classification, and routes the data packet to the L3/L4 data stack 36.

Downlink Solution B: Micro-Controller Controlled DPHW

In this solution, MAC layer hardware (MAC HW) receives the data bytes from the PHY layer 34. The data bytes are then processed by the rest of the DP layer hardware (i.e., RLC HW, PDCP HW, and SDAP HW), with the support from the micro controller L2 µC. As shown in Steps 35 and 37, for example, the process moves between the DPHW and the micro controller L2 µC. This provides more flexibility to control the DPHW at each layer, enabling (1) adding additional customized processing at each layer; and/or (2) controlling the timing and routing at each layer.

Downlink Solution C: Hybrid Data-Path-Control (DPC) Software

In this solution, the vendor or manufacturer of the UE has the option to run its own data plane asynchronous control functions, such as "RLC ARQ status reporting," "Radio Bearers Release and/or Suspension and Re-establishment," "Logical Channels Release and/or Suspension and Re-establishment" etc. This can be done by a main processor of the UE through the data-path-control (DPC) function of the control plane 301 and the DPC API. When these asynchronous control functions are performed, corresponding functions at the L2 data plane solution 305 are temporarily disabled.

It is noted that although only Solutions A, B, and C are discussed in FIG. 3, these solutions are only examples and are not meant to be limiting in any way. For example, although in Solutions B and C of FIG. 3, the micro controller interacts or intervenes the process of the RLC HW, in other embodiments, the micro controller can interact or intervene the processes of other components of the data plane hardware.

Figure 4:
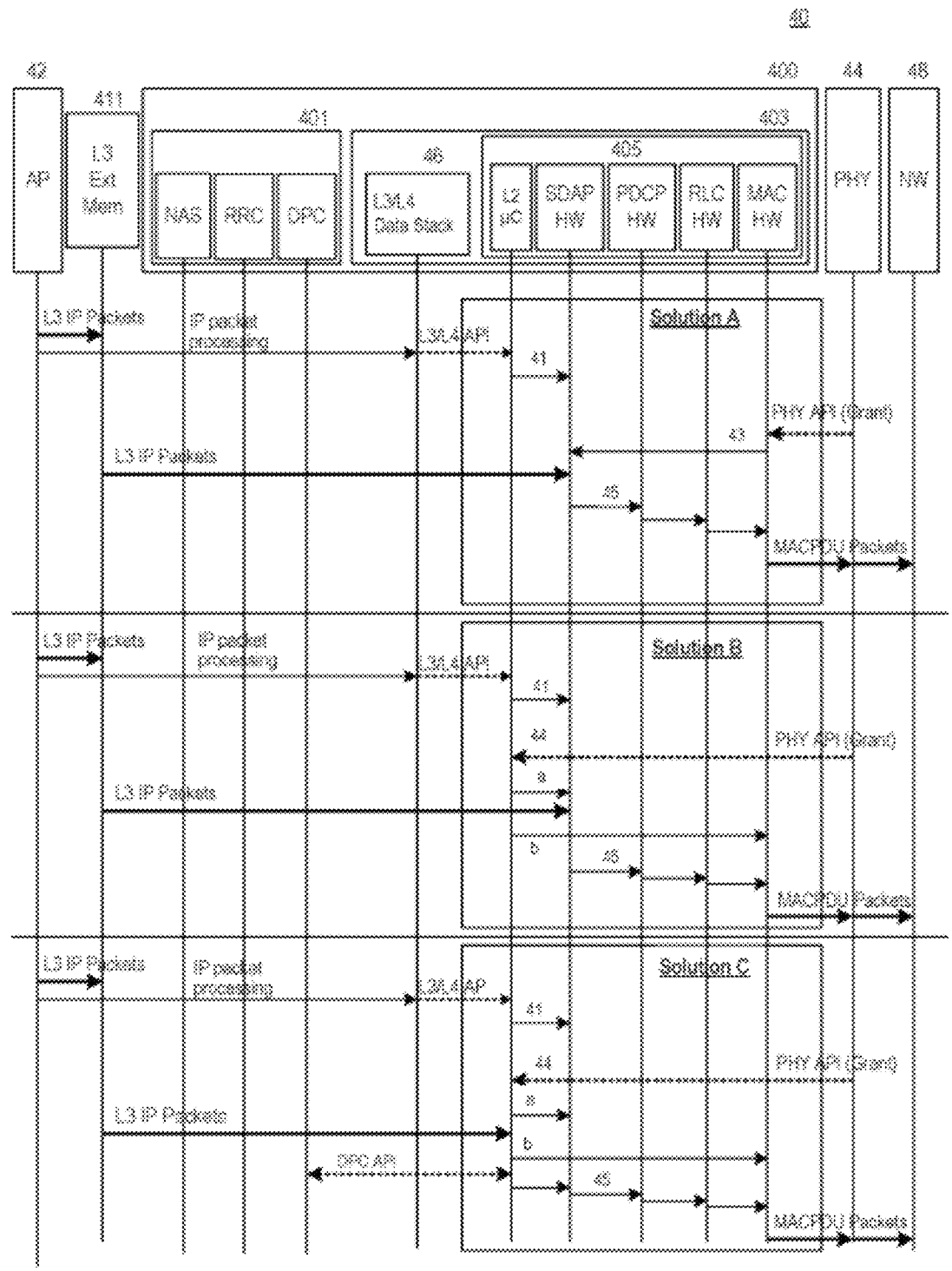
FIG. 4 is a schematic diagram illustrating a uplink (UL) data transfer process in accordance with implementations of the present disclosure.

FIG. 4 is a schematic diagram illustrating an uplink (UL) data transfer process 40 in accordance with one or more implementations of the present disclosure. In FIG. 4, data flow is indicated by bold arrows. Dashed arrows indicate processes involving an API, whereas solid arrows indicates data processing steps. As shown in FIG. 4, in the UL data transfer process 40, data is transferred from an application (AP) 42 to a network (NW) 48, via a physical layer 44 and L2/L3/L4 layers of a UE protocol stack 400. The UE protocol stack 400 includes (1) a control plane 401 configured to control the data transfer and (2) a data plane 403 configured to transfer/process the data transfer.

The control plane 401 performs NAS, RRC, and DPC functions (as discussed above with reference to FIGS. 2A and 2B). The data plan 405 includes an L2 data plane solution 405 and an L3/L4 data stack 46. The L2 data plane solution 405 includes data plane hardware (DPHW) configured to perform SDAP, PDCP, RLC, and MAC layer functions (indicated as SDAP HW, PDCP HW, RLC HW, and MAC HW in FIG. 4). The L2 data plane solution 405 includes a micro controller L2 µC configured to control the data plane hardware (DPHW) and perform functions involving APIs (e.g., L3/L4 API, PHY API, and DPC API, as discussed above in FIGS. 2A and 2B) of the L2 data plane solution 405. The UE can include a main processor (not shown in FIG. 4) and an L3 external memory 411. The L3 external memory 411 is configured to store information associated with the L2 data plane solution 405.

After RRC connection is setup (i.e., packet data transfer is enabled), the L3/L4 data stack 46 starts receiving IP packets from the application 42. IP packets are processed and stored in the L3 external memory 411. The L3 data packet descriptors can be sent to the L2 data plane solution 405 (e.g., to SDAP HW via the L3/L4 API) to perform an IP QoS classification (Step 41) to a designated radio bearer queue in the micro controller L2 µC or a L2 local memory.

The L2 data plane solution 405 provides configurable and programmable UL mode settings, including various types of implementations. For the illustration purposes, three examples, Solutions A, B, and C, and the corresponding processes are discussed with reference to in FIG. 4.

Uplink: Solution A: Automated Data Plane Hardware (DPHW)

In this solution, an "UL Grant" is received by the MAC layer hardware (part of the DPHW), which extracts the grant size and kickstarts a MAC LCP process, specifying the layers, functions and logical channels that are enabled for this "UL Grant." The DPHW runs the MAC LCP process autonomously, including (i) dequeuing packet descriptors from the logical channels and radio bearers queues in the L2 local memory (Step 43), (ii) transferring data bytes from the L3 external memory 411, (iii) processing through PDCP ROHC, UDC compression, ciphering, integrity check, and adding PDCP, RLC and MAC headers (Step 45), and (iv) placing the data bytes into a buffer (e.g., in the L2 local memory) before streaming the data bytes to the PHY layer 44 when it pulls data out.

Uplink: Solution B: Micro-Controller Controlled DPHW

In this solution, the "UL Grant" is received by the micro controller L2 µC (Step 44), which then performs the MAC LCP process to compose the packet list for MAC PDU packets. It controls the DPHW to perform HW functions at each layer (Steps a, b), and integrates the results for the PHY layer 44 for transmission (Step 45).

Uplink: Solution C: Hybrid Data-Path-Control (DPC) Software

In this solution, the vendor or manufacturer of the UE has the option to run its own data plane asynchronous control functions, such as "UL MAC Random Access," "UL MAC Scheduling Requests," "UL MAC Control Element (CE) Requests," etc. This can be done by a main processor of the UE through the data-path-control (DPC) function of the control plane 301 and the DPC API. When these asynchronous control functions are performed, corresponding functions at the L2 data plane solution 305 are temporarily disabled. In such embodiments, corresponding packet descriptors requests (e.g., for relevant radio bearer, linkage control, MAC CE queues, etc.) are to be placed in the L2 local memory.

It is noted that although only Solutions A, B, and C are discussed in FIG. 4, these solutions are only examples and are not meant to be limiting in any way. For example, although in Solutions B and C of FIG. 4, the micro controller interacts or intervenes the process of the SDAP HW, in other embodiments, the micro controller can interact or intervene the processes of other components of the data plane hardware.

Figure 5:
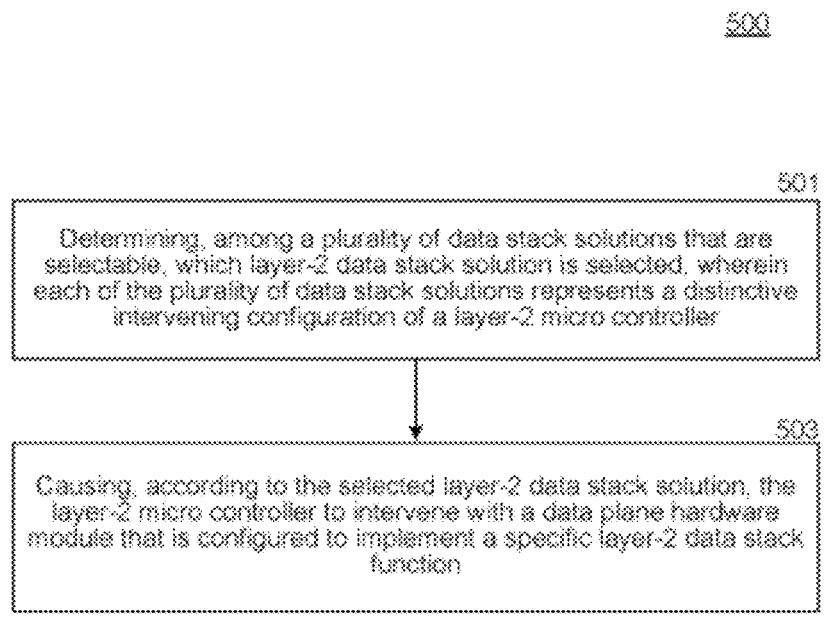
FIG. 5 is a flowchart of a method in accordance with one or more implementations of the present disclosure.

FIG. 5 is a flowchart of a method 500 in accordance with one or more implementations of the present disclosure. The method 500 is for implementing layer-2 network communication in a data plane. The method 500 can be used to design a data stack architecture design for a L2 data stacks used in telecommunication devices.

At block 501, the method 500 includes determining, among a plurality of data stack solutions that are selectable, which layer-2 data stack solution is selected. Each of the plurality of data stack solutions represents a distinctive intervening configuration of a layer-2 micro controller. Examples of the layer-2 functions include functions related to service data adaptation protocol (SDAP), packet data convergence protocol (PDCP), radio link control (RLC), and/or media access control (MAC).

Each of the plurality of data stacks includes a micro controller, a local memory, and data plane hardware to implement layer-2 data stack functions. The data plane hardware modules can include, for example, a SDAP hardware module, a PDCP hardware module, a RLC hardware module, and a MAC hardware module (e.g., SDAP HW, PDCP HW, RLC HW, and MAC HW in FIGS. 3 and 4). Different ones of the plurality of data stack solution can have different types of data plane hardware modules. The micro controller is configurable to manage or intervene the process of the data plane hardware modules (e.g., the implementation of the layer-2 data stack functions). In other words, different data stack solutions can have different levels of control or distinctive "intervening" capabilities or "intervening" configurations.

In some embodiments, for example, the distinctive intervening configuration can be "the micro controller to intervene the process of the RLC hardware module," "the micro controller to intervene the processes of the SDAP hardware module and the RLC hardware module," "the micro controller to monitor the process of the PDCP hardware module," and "the micro controller to be instructed by a main processor to intervene the process of the RLC hardware module," etc. The plurality of data stack can include uplink and downlink solutions. Examples of the downlink solutions can be found in FIG. 3. Examples of the uplink solutions can be found in FIG. 4.

In some embodiments, data stack solutions with a "low" intervening capability allow the data plane hardware to automatically implement the layer-2 data stack functions with a minimum supervision from the micro controller. Examples of the data stack solutions with the low intervening capability include Solutions A discussed in FIGS. 3 and 4. In some embodiments, the micro controller can be configurable to monitor, verify, or supervise one or more of the layer-2 data stack functions performed by the data plane hardware based on instructions stored in the local memory of the layer-2 data stack solution.

In some embodiments, data stack solutions with a "medium" intervening capability allow the micro controller to intervene at least a portion of the data plane hardware when the layer-2 data stack functions are implemented. Examples of the data stack solutions with the medium intervening capability include Solutions B discussed in FIGS. 3 and 4. In such embodiments, the micro controller can be configurable to intervene one or more of the layer-2 data stack functions performed by the data plane hardware based on instructions stored in the local memory of the layer-2 data stack solution.

In some embodiments, data stack solutions with a "high" intervening capability enables external control of the micro controller. For example, via a data-path control (DPC) layer in a control plane and a DPC API of the data stack solution in a data plane, the micro controller can be instructed by an external processor (e.g., a processor of a modem) to intervene at least a portion of the data plane hardware when implementing the layer-2 data stack functions. Examples of the data stack solutions with the medium intervening capability include Solutions C discussed in FIGS. 3 and 4. Examples of the DPC layer include the DPC layer shown in FIG. 2B. Examples of the DPC API include the DPC API 2051 shown in FIG. 2B. The DPC API provided by the layer-2 data stack solution enables various ways of communicating with the DPC layer in the control plane.

At block 503, the method 500 includes causing, according to the selected layer-2 data stack solution, the layer-2 micro controller to intervene with a data plane hardware module that is configured to implement a specific layer-2 data stack function. In some embodiments, the layer-2 micro controller is coupled to a number of data plane hardware modules that are configured to implement different layer-2 data stack functions. In some embodiments, the intervening configuration of the layer-2 micro controller is indicative of a level of control of the layer-2 micro controller over the data plane hardware modules.

For example, when a design customer requires a high intervening capacity, solutions similar to Solutions C discussed in FIGS. 3 and 4 can be selected from the plurality of data stack solutions. Similarly, when a design customer requires a medium or low intervening capacity, solutions similar to Solutions B or Solutions C discussed in FIGS. 3 and 4 can be selected from the plurality of data stack solutions.

In some embodiments, in addition to the DPC API discussed above, the layer-2 data stack solution can also include (i) a layer-3/layer-4 API for communicating with a layer-3/layer-4 data stack, and (ii) a physical layer API for communicating with a PHY subsystem. In some embodiments, the micro controller can be configurable to control the communications via these APIs.

Examples of the layer-3/layer-4 data stack include the L3/L4 data stack 26 shown in FIGS. 2A and 2B, the L3/L4 data stack 36 shown in FIG. 3, and the L3/L4 data stack 46 shown in FIG. 4. Examples of the layer-3/layer-4 API include the L3/L4 API 2052 shown in FIG. 2B. The L3/L4 API provided by the L2 data stack solution enables various ways of communicating with the L3/L4 data stack. For example, in a downlink (DL) process (e.g., FIG. 3) or an uplink (UL) process (e.g., FIG. 4), the L3/L4 API can be used for a micro controller of the layer-2 data stack solution to communicate with the L3/L4 data stack.

Examples of the PHY subsystem include the PHY subsystem 24 shown in FIGS. 2A and 2B, the PHY layer 34 shown in FIG. 3, and the PHY layer 44 shown in FIG. 4. Examples of the PHY API include the PHY API 2053 shown in FIG. 2B. The PHY API provided by the layer-2 data stack solution enables various ways of communicating with the PHY subsystem. For example, in a downlink (DL) process (e.g., FIG. 3), the PHY API can be used for a data plane hardware (e.g., MAC HW) of the layer-2 data stack solution to communicate with the PHY subsystem. As another example, in an uplink (UL) process (e.g., FIG. 4), the PHY API can be used for a micro controller of the layer-2 data stack solution or a data plane hardware (e.g., MAC HW) of the layer-2 data stack solution to communicate with the PHY subsystem.

In some embodiments, information associated with the layer-2 data stack solution (e.g., signals, parameters, etc.) can be stored in an external memory (external to the layer-2 data stack solution). In some embodiments, the external memory can be a memory of user equipment (e.g., a modem, a mobile device, etc.) that uses the layer-2 data stack solution to communicate. The information associated with the layer-2 data stack stored in the external memory can be accessed via an application layer or a host layer. In some embodiments, the data plane hardware can access the stored information in the external memory as well. In some embodiments, the information associated with the layer-2 data stack stored in the locate memory (e.g., coupled to and controlled by the micro process controller) of the layer-2 data stack solution. In some embodiments, the information associated with the layer-2 data stack can be stored in both of the local memory and the external memory.

In some embodiments, the micro controller can send (or receive) parameters to (or from) the data plane hardware to control/verify its process of performing the layer-2 data plane functions. By this arrangement, the layer-2 data stack solution can effectively manage the data plane hardware so as to perform a customized function. In some embodiments, the micro controller can coordinate the processes of the data plane hardware such that the processes can be performed in particular orders.

Example Devices and Systems

Figure 6:
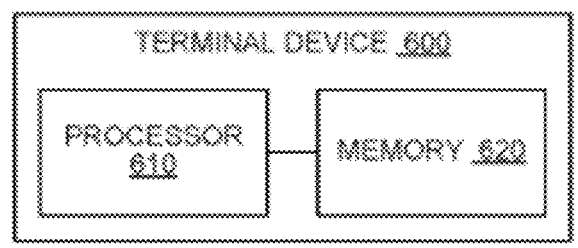
FIG. 6 is a schematic block diagram of a terminal device in accordance with one or more implementations of the present disclosure.

FIG. 6 is a schematic block diagram of a terminal device 600 (e.g., an example of the terminal device 103 of FIG. 1) in accordance with one or more implementations of the present disclosure. As shown in FIG. 6, the terminal device 600 includes a processing unit 610 (e.g., a DSP, a CPU, a GPU, etc.) and a memory 620. The processing unit 610 can be configured to implement instructions that correspond to the method 500 of FIG. 5 and/or other aspects of the implementations described above.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular implementations, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both. The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A method for implementing layer-2 network communication in a data plane, the method comprising:
    determining, among a plurality of data stack solutions that are selectable, which layer-2 data stack solution is selected, wherein each of the plurality of data stack solutions comprises a layer-2 micro controller, a local memory and at least one data plane hardware module, wherein each of the plurality of data stack solutions represents a distinctive intervening configuration of the layer-2 micro controller; and
    causing, according to the selected layer-2 data stack solution, the layer-2 micro controller to intervene with the at least one data plane hardware module that is configured to implement a specific layer-2 data stack function,
    wherein the layer-2 micro controller is coupled to the at least one data plane hardware module, wherein different data plane hardware modules are configured to implement different layer-2 data stack functions, and
    wherein the intervening configuration of the layer-2 micro controller is indicative of a level of control of the layer-2 micro controller over the at least one data plane hardware module, and wherein the at least one data plane hardware comprises at least one of:
        a service data adaptation protocol (SDAP) hardware module;
        a packet data convergence protocol (PDCP) hardware module;
        a radio link control (RLC) hardware module; or
        a media access control (MAC) hardware module.

2. The method of claim 1, wherein the layer-2 micro controller is configurable to intervene one or more of the layer-2 data stack functions performed by the at least one data plane hardware module based on instructions stored in the local memory to the layer-2 data stack solution.

3. The method of claim 1, wherein the layer-2 micro controller is configurable to intervene one or more of the layer-2 data stack functions performed based on instructions received from a main processor of a control plane via a data-path-control (DPC) layer of the control plane and a DPC application programing interface (API) of the layer-2 data stack solution.

4. The method of claim 1, wherein the plurality of data stack solutions include multiple downlink (DL) solutions.

5. The method of claim 4, wherein the multiple DL solutions include a solution that the layer-2 micro controller is configured to monitor the layer-2 data stack functions automatically implemented by the at least one data plane hardware module.

6. The method of claim 4, wherein the multiple DL solutions include a solution that the layer-2 micro controller is configured to intervene an RLC function of the layer-2 data stack functions performed by the RLC hardware module.

7. The method of claim 4, wherein the multiple DL solutions include a solution that the layer-2 micro controller is configured to intervene an RLC function of the layer-2 data stack functions performed by the RLC hardware module, in response to instructions received from a main processor of a control plane via a data-path-control (DPC) layer of the control plane and a DPC application programming interface (API) of the layer-2 data stack solution.

8. The method of claim 1, wherein the plurality of data stack solutions include multiple uplink (UL) solutions.

9. The method of claim 8, wherein the multiple UL solutions include a solution that the layer-2 micro controller is configured to monitor the layer-2 data stack functions automatically implemented by the at least one data plane hardware module.

10. The method of claim 8, wherein the multiple UL solutions include a solution that the micro controller is configured to intervene an RLC function of the layer-2 data stack functions performed by the RLC hardware module.

11. The method of claim 8, wherein the multiple UL solutions include a solution that the layer-2 micro controller is configured to intervene an RLC function of the layer-2 data stack functions performed by the RLC hardware module, in response to instructions received from a main processor of a control plane via a data-path-control (DPC) layer of the control plane and a DPC application programming interface (API) of the layer-2 data stack solution.

12. The method of claim 1, wherein the layer-2 micro controller is configurable to:
    coordinate communicating with a layer-3/layer-4 data stack via a layer-3/layer-4 application programming interface (API); and
    coordinate communicating with the physical layer (PHY) subsystem via the PHY API.

13. The method of claim 1, further comprising:
    storing information associated with the layer-2 data stack solution in an external memory.

14. The method of claim 13, further comprising:
    accessing the information associated with the layer-2 data stack stored in the external memory via an application layer.

15. The method of claim 13, further comprising:
    accessing the information associated with the layer-2 data stack stored in the external memory by the data plane hardware.

16. The method of claim 1, further comprising:
storing information associated with the layer-2 data stack solution in the local memory coupled to the layer-2 micro controller.

17. The method of claim 16, further comprising:
accessing the information associated with the layer-2 data stack stored in the local memory via by a main processor of a control plane via a data-path-control (DPC) layer of the control plane and a DPC application programming interface (API) of the layer-2 data stack solution.

18. An apparatus, comprising:
a memory; and
a processor coupled to the memory and configured to:
 determine, among a plurality of data stack solutions that are selectable, which layer-2 data stack solution is selected, wherein each of the plurality of data stack solutions comprises a layer-2 micro controller, a local memory and at least one data plane hardware module, wherein each of the plurality of data stack solutions represents a distinctive intervening configuration of the layer-2 micro controller; and
 cause, according to the selected layer-2 data stack solution, the layer-2 micro controller to intervene with the at least one data plane hardware module that is configured to implement a specific layer-2 data stack function,
 wherein the layer-2 micro controller is coupled to the at least one data plane hardware module, wherein different data plane hardware modules are configured to implement different layer-2 data stack functions, and
 wherein the intervening configuration of the layer-2 micro controller is indicative of a level of control of the layer-2 micro controller over the at least one data plane hardware module, and
 wherein the at least one data plane hardware module comprises at least one of: a service data adaptation protocol (SDAP) hardware module, a packet data convergence protocol (PDCP) hardware module, a radio link control (RLC) hardware module, or a media access control (MAC) hardware module.

19. A non-transitory, computer-readable medium having instructions stored thereon that, when executed by one or more processors, cause the one or more processors to implement the instructions so as to perform a method, the method comprising:
 determining, among a plurality of data stack solutions that are selectable, which layer-2 data stack solution is selected, wherein each of the plurality of data stack solutions comprises a layer-2 micro controller, a local memory and at least one data plane hardware module, wherein each of the plurality of data stack solutions represents a distinctive intervening configuration of the layer-2 micro controller; and
 causing, according to the selected layer-2 data stack solution, the layer-2 micro controller to intervene with the at least one data plane hardware module that is configured to implement a specific layer-2 data stack function,
 wherein the layer-2 micro controller is coupled to the at least one data plane hardware module, wherein different data plane hardware modules are configured to implement different layer-2 data stack functions, and
 wherein the intervening configuration of the layer-2 micro controller is indicative of a level of control of the layer-2 micro controller over the at least one data plane hardware module, and wherein the at least one data plane hardware comprises at least one of:
  a service data adaptation protocol (SDAP) hardware module;
  a packet data convergence protocol (PDCP) hardware module;
  a radio link control (RLC) hardware module; or
  a media access control (MAC) hardware module.

* * * * *